United States Patent [19]
Kamo et al.

[11] Patent Number: 6,112,523
[45] Date of Patent: Sep. 5, 2000

[54] MULTISTAGE SUPERCHARGING SYSTEM FOR A RECIPROCATING ENGINE

[75] Inventors: Keisuke Kamo; Iwao Murata; Tatsuya Itonaga; Akira Yagawa, all of Tokyo-To; Masaru Kurihara, Mitaka, all of Japan

[73] Assignee: Fuji Jukogyo Kabushiki Kaisha, Tokyo, Japan

[21] Appl. No.: 09/299,629

[22] Filed: Apr. 27, 1999

[30] Foreign Application Priority Data

Apr. 30, 1998 [JP] Japan .................................. 10-121312

[51] Int. Cl.$^7$ .................................................. F02B 33/44
[52] U.S. Cl. .............................................. 60/612; 60/600
[58] Field of Search ...................................... 60/600, 612

[56] References Cited

FOREIGN PATENT DOCUMENTS

| 59-82526 | 5/1984 | Japan | 60/612 |
| 3-294623 | 12/1991 | Japan | 60/612 |
| 4-17725 | 1/1992 | Japan | 60/612 |

*Primary Examiner*—Noah P. Kamen
*Attorney, Agent, or Firm*—Smith Gambrell & Russell, LLP

[57] ABSTRACT

A multistage supercharging system for a reciprocating engine, which is suitable for use in an aircraft capable of flying at high altitude, includes plural stage turbochargers connected in series to each other. A control unit controls operation of these turbochargers. The turbocharger at each stage includes a turbine side bypass passage bypassing the turbine, a compressor side bypass passage bypassing the compressor, a wastegate valve for controlling the flow rate of exhaust flowing through the turbine side bypass passage, a bleed valve for controlling the flow rate of intake air flowing through the compressor side bypass passage, and a pressure sensor disposed at the downstream side of the compressor. The control unit receives a signal from the pressure sensor, and controls the respective valves to selectively operate the turbochargers.

18 Claims, 11 Drawing Sheets

MULTISTAGE SUPERCHARGING SYSTEM FOR A RECIPROCATING ENGINE

BACKGROUND OF THE INVENTION

1. Field of the Invention

The present invention relates to a multistage supercharging system of a reciprocating engine for an aircraft. More particularly, the invention relates to a multistage supercharging system used for a reciprocating engine of an aircraft capable of flying at an altitude of 25 Km or higher for a long time.

2. Description of the Related Art

In recent years, for various research projects (such as investigations of the behavior of the earth's atmosphere), aircraft capable of flying at an altitude of 25 Km or higher for a long time have been developed. The propulsion systems used for such aircraft include jet engines and reciprocating engines with multistage turbochargers. These systems are described in more detail below.

Typical jet engines include axial-flow compressors of multistage structure. In this type of axial-flow compressor, when the Reynolds number of a cascade of compressor blades is lowered by an increase in altitude, air flow separation occurs. This air flow separation influences the cascade of compressor blades at a back stage side, thereby lowering the efficiency of the compressor.

As is apparent from FIG. 8, which shows the relationship between altitude and Reynolds number, the critical Reynolds number of the axial-flow compressor is Re=50,000, and the corresponding altitude is about 20 km. Because of this relationship, if an aircraft flies at an altitude higher than about 20 km, the compressor does not work normally.

In addition, because jet engines quickly consume fuel, long flights at high altitudes with jet engine propelled aircraft cannot be obtained.

The following types of compressors can be used in jet engines: axial-flow compressors, centrifugal compressors, and oblique-flow compressors. The characteristics of air flow separation when the Reynolds number is lowered in these compressors are as follows:

(1) Because axial-flow compressors have a multistage structure, air flow separation at an early stage in the compressor influences the later stages.

(2) Air flow separation occurring at an impeller of a centrifugal compressor is again attached by centrifugal force.

(3) Oblique-flow compressors show characteristics equivalent to centrifugal compressors.

Thus, when the Reynolds number influence on compressor efficiency is taken into consideration, it is apparent that centrifugal compressors or oblique-flow compressors must be used for propulsion systems of high altitude aircraft flying at an altitude of 25 km or higher.

In reciprocating engines, engine output is lowered by the decrease of air density at high altitude. But, if the pressure of the engine intake air is boosted up to a pressure comparable to atmospheric pressure at ground level by using a turbocharger, the output of the engine can be increased. In addition, because reciprocating engines have a small fuel consumption rate, longer flights becomes possible with a limited amount of loaded fuel.

As shown in FIG. 9, the maximum pressure ratio value in existing turbochargers is about 4.5:1 for an aircraft.

From this data, it follows that using a reciprocating engine equipped with a one stage turbocharger, an engine output comparable to that at ground level can be obtained up to an altitude of about 11 km, at which altitude the atmospheric pressure becomes about ¼ of that at ground level.

When a reciprocating engine equipped with a two stage turbocharger is considered, an aircraft has an altitude limit of about 21 km, at which altitude the atmospheric pressure becomes about $1/(4.5 \times 4.5) = 1/20$ of the atmospheric pressure at ground level.

Thus, to enable flight at an altitude of 25 km or higher, it is necessary to combine at least three turbocharger stages with the reciprocating engine.

A technical discussion concerning a reciprocating engine equipped with three stage turbochargers to enable flight at a high altitude follows.

First, a reciprocating engine with three stage turbochargers made by GROB Co., which was mounted on aircraft STRATO2C made in Germany and with past records of flight at an altitude of 24 km, will be described.

As shown in FIG. 10, the turbochargers of this engine include a high pressure stage turbocharger 1, a two-axis low pressure stage turbocharger 2, and an intermediate pressure stage turbocharger 3. When the aircraft flies at an altitude of lower than 7 km, only the high pressure stage turbocharger 1 is used. When the aircraft flies at an altitude of higher than 7 km, all of the turbochargers 1, 2, and 3 are operated to supply a supercharging pressure.

In the ERAST (Environmental Research Aircraft and Sensor Technology) program developed by NASA, a reciprocating engine with three stage turbochargers has been developed which is capable of flight at an altitude of about 25 km.

As shown in FIG. 11, turbines 11, 12, and 13 of the high pressure stage, the intermediate pressure stage, and the low pressure stage turbochargers, respectively, are connected to each other through one pipe 14. By this arrangement, the exhaust energy of the engine drives all of the turbines 15, 16, and 17 of the high pressure stage, the intermediate pressure stage, and the low pressure stage turbochargers, respectively, to produce supercharging. It appears that when a higher supercharging pressure is obtained than that needed, a throttle 18 of the engine and a wastegate valve 19 are operated so that the supercharging pressure is controlled.

In the reciprocating engine with the three stage turbochargers made by GROB Co. (see FIG. 10), the high pressure stage turbocharger 1 bypasses exhaust energy of the engine through an exhaust wastegate valve 4 to an exhaust pipe 5, and supercharging pressure obtained by a high pressure stage compressor is bypassed to an exhaust pipe 7 through a high pressure stage bleed valve 6, so that the supercharging pressure is controlled.

When control is accomplished by bypassing the supercharging pressure obtained by the compressor to an exhaust pipe in this manner, that is, by throwing away the supercharging pressure via the exhaust pipe, the compressor operates more than necessary, thereby resulting in low system efficiency.

In addition, in the low pressure stage and intermediate pressure stage turbochargers 2 and 3, respectively, because one pipe 8 connects the turbine outlet of the high pressure stage turbocharger 1 and the low pressure stage and intermediate pressure stage turbines, the low pressure stage and intermediate pressure stage turbines also are driven by the exhaust energy of the high pressure stage turbine. Therefore, because the low pressure stage and intermediate pressure stage compressors are always driven irrespective of whether supercharging is necessary, the driving loss is large.

Moreover, this system is designed such that when a higher supercharging pressure than that needed is obtained by the low pressure stage and intermediate pressure stage compressors, the excess pressure is bypassed to the exhaust pipe by a low pressure stage bleed valve 9L and an intermediate pressure stage bleed valve 9I in a manner similar to that used with the high pressure stage turbocharger. This results in a low system efficiency.

In the NASA reciprocating engine with the three stage turbochargers (see FIG. 11), because pipes 14 connect the turbines, the exhaust energy of the engine always drives each of the high pressure stage, intermediate pressure stage, and low pressure stage turbines 11, 12, and 13, respectively. Therefore, the low pressure stage, intermediate pressure stage, and high pressure stage compressors 15, 16, and 17 are always operated, resulting in a large driving loss.

In a low altitude flight, it is not necessary to operate all of the three stage turbochargers. However, because this system always drives all of the turbochargers, the supercharging pressure required at low altitude is divided among the turbochargers. Because of this arrangement, it is impossible to use the compressors at each stage in a high efficiency range based on the flight altitude, and therefore, the efficiency of the whole system is lowered.

Moreover, in this system, because all of the turbines are driven together, a time delay occurs in the response of the turbines and compressors. For this reason, when an abrupt pressure change occurs at the intake or exhaust of the engine, for example, from a gust of wind or the like, there is a possibility that the operation of the engine will become unstable because of this response time delay, thereby making control difficult.

SUMMARY OF THE INVENTION

An object of the present invention is to provide a multistage supercharging system for a reciprocating engine, which resolves the problems of the prior art and which may be used for an aircraft capable of flying at an altitude of 25 km or higher for a long time.

In order to solve the foregoing problems, a multistage supercharging system according to the invention supplies boosted intake air to a reciprocating engine for an aircraft. This system comprises multistage turbochargers connected in series to each other, and a control means for controlling the operation of these turbochargers.

The turbocharger at each stage comprises a turbine rotated by receiving exhaust from the reciprocating engine; a compressor driven by the turbine for boosting intake air supplied to the reciprocating engine; a turbine side bypass passage for allowing the exhaust to bypass the turbine and to be directly supplied from an upstream side to a downstream side; a compressor side bypass passage for allowing the intake air boosted by the compressor to bypass the compressor and to return from a downstream side of the compressor to an upstream side; a wastegate valve for controlling a flow rate of the exhaust flowing through the turbine side bypass passage; a bleed valve for controlling a flow rate of the intake air flowing through the compressor side bypass passage; valve operating means for operating the wastegate valve and the bleed valve; and a pressure sensor disposed at the downstream side of the compressor.

The control means receives a signal from the pressure sensor, controls operation of the valve operating means, and controls operation of the turbocharger at each of the stages.

Preferably, when the pressure value obtained from the pressure sensor at one of the stages reaches a predetermined value, the control means operates the valve operating means at this stage to close the turbine side bypass passage and the compressor side bypass passage, thereby initiating operation of the turbine and the compressor at this stage.

The predetermined values at each of the stages can be determined such that at a previously set flight altitude, the ratio of intake air pressure at the upstream side of the compressor to that at the downstream side thereof are equal at all of the stages.

When an increase in pressure per unit time obtained from the pressure sensor at one of the stages exceeds a predetermined value, the control means opens the bleed valve so that part of the intake air boosted by the compressor at this stage is returned to the upstream side of the compressor through the compressor side bypass passage.

The wastegate valve includes a valve body capable of controlling flow rates such that an opening degree of the valve is in proportion to the amount of the exhaust flowing through the turbine side bypass.

Similarly, the bleed valve includes a valve body capable of controlling flow rates such that an opening degree of the valve is in proportion to the amount of the intake air flowing through the compressor side bypass.

It is possible to design this system such that the valve operating means uses the pressure of the engine lubricating oil to operate the wastegate valve and the bleed valve.

The pressure sensor detects an absolute pressure.

The compressor is a centrifugal compressor.

In the multistage supercharging system for a reciprocating engine according to the present invention, the wastegate valves and the bleed valves of the turbochargers at the respective stages are separately controlled. In this manner, the turbochargers at the respective stages can be separately operated without depending on the turbochargers at the other stages.

By using this system according to the invention, because it is not necessary to always operate all turbochargers at plural stages (in contrast to the existing systems), it is possible to reduce driving loss and to lower the fuel consumption rate of the engine.

When the pressure value obtained from the pressure sensor at one of the stages reaches the predetermined value for that stage, the wastegate valve and the bleed valve at that stage are controlled so that the turbine and the compressor at that stage can be operated.

In this manner, it is possible to operate the turbocharger at each stage in the range of highest efficiency based on the flight altitude of the aircraft, thereby improving the efficiency of the whole system.

If the values of the predetermined values set for each stage is suitably determined, at a previously set flight altitude, the ratio of the intake air pressure at the upstream side of the compressor to that at the downstream side thereof can be made equal for all of the stages.

In this manner, because the compression work for boosting the engine intake air can be performed close to an isotherm of a compression process PV diagram, it is possible to reduce the compression work and to improve the efficiency of the whole system.

Additionally, in the multistage supercharging system for a reciprocating engine according to the present invention, even when part of the intake air boosted by the compressor is extracted and is not supplied to the engine, the extracted intake air is returned to the upstream side of the compressor.

In this manner, contrary to conventional systems in which intake air boosted by the compressor is discharged through the exhaust passage, because it is not necessary to make the compressor work more than absolutely necessary, the efficiency of the whole system is improved.

In addition, the multistage supercharging system for a reciprocating engine according to the present invention comprises a bleed valve at the compressor side bypass passage for returning intake air from the downstream side of the compressor at each stage to the upstream side.

Using this feature, when abrupt changes occur in the engine intake air pressure by influence of a gust of wind or the like encountered during flight, the wastegate valve provided at the turbine side bypass passage and the bleed valve provided at the compressor side bypass passage operate together, so that it is possible to reduce the pressure control instability of the intake air supplied to the engine and to quickly stabilize the operation of the engine.

DETAILED DESCRIPTION OF THE PREFERRED EMBODIMENTS

A multistage supercharging system for a reciprocating engine according to an embodiment of the present invention will now be described with reference to FIGS. 1 to 7.

Figure 1:
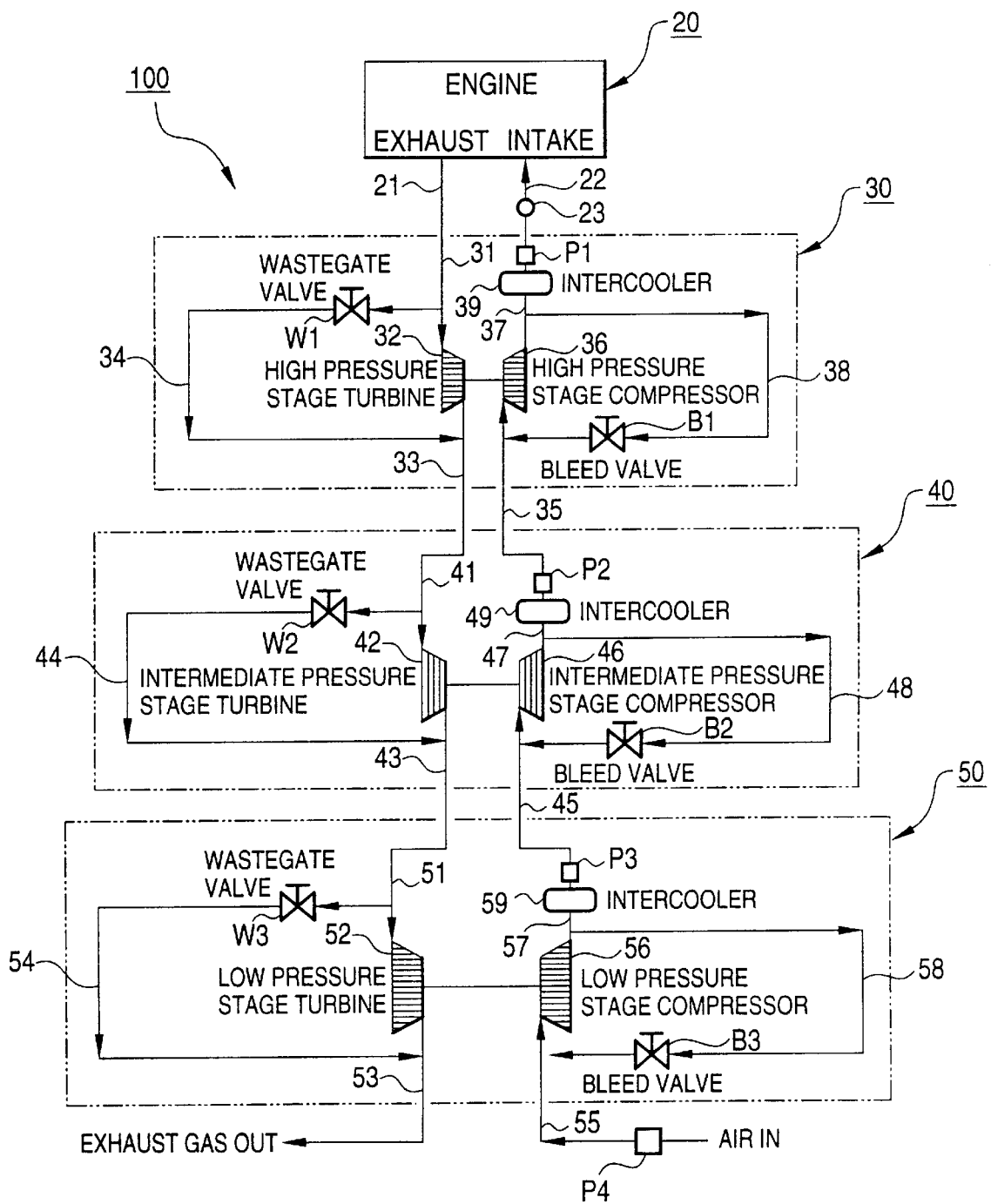
FIG. 1 is a schematic view showing a structure of a multistage supercharging system for a reciprocating engine according to an embodiment of the present invention.

As shown in FIG. 1, a multistage supercharging system 100 for a reciprocating engine according to this embodiment comprises three stage turbochargers including a high pressure stage turbocharger 30, an intermediate pressure stage turbocharger 40, and a low pressure stage turbocharger 50. This system boosts intake air supplied to an engine 20 for an aircraft. Wastegate valves W1, W2, and W3 and bleed valves B1, B2, and B3 are provided for the respective turbochargers, and pressure sensors P1, P2, and P3 are provided respectively at a compressor outlet side of the turbocharger at each stage. A control means for controlling the operation of the valves on the basis of pressure values detected by these sensors also is provided (control means not illustrated).

The high pressure stage turbocharger 30 includes an exhaust intake pipe 31 for receiving exhaust from an exhaust pipe 21 of the engine 20. A high pressure stage turbine 32 is driven by the received exhaust, and an exhaust pipe 33 exhausts the gases from the high pressure stage turbine 32.

The high pressure stage turbocharger 30 further includes a turbine side bypass passage 34 for allowing the exhaust received in the exhaust intake pipe 31 to bypass the high pressure stage turbine 32 and to be directly supplied to the exhaust pipe 33 at the downstream side. The wastegate valve W1 controls the flow rate of the exhaust flowing through the turbine side bypass passage 34. This valve W1 is provided at an intermediate location along the turbine side bypass passage 34.

The high pressure side turbocharger 30 additionally includes an intake air intake pipe 35 for receiving intake air from the intermediate pressure stage turbocharger 40. A high pressure stage compressor 36 is driven by the high pressure stage turbine 32 to boost the intake air received through the intake air intake pipe 35. An intake air supply pipe 37 supplies intake air boosted by the high pressure stage compressor 36 to a suction pipe 22 of the engine 20.

The high pressure stage turbocharger 30 also includes a compressor side bypass passage 38 for extracting intake air boosted by the high pressure stage compressor 36 and for returning it to the intake air intake pipe 35 at the upstream side of the high pressure stage compressor 36. The bleed valve B1 controls the flow rate of the intake air flowing through the compressor side bypass passage 38. This valve B1 is provided at an intermediate location along the compressor side bypass passage 38.

Further, an intercooler 39 for cooling the intake air supplied to the engine 20 is provided in the intake air supply pipe 37.

Figure 2:
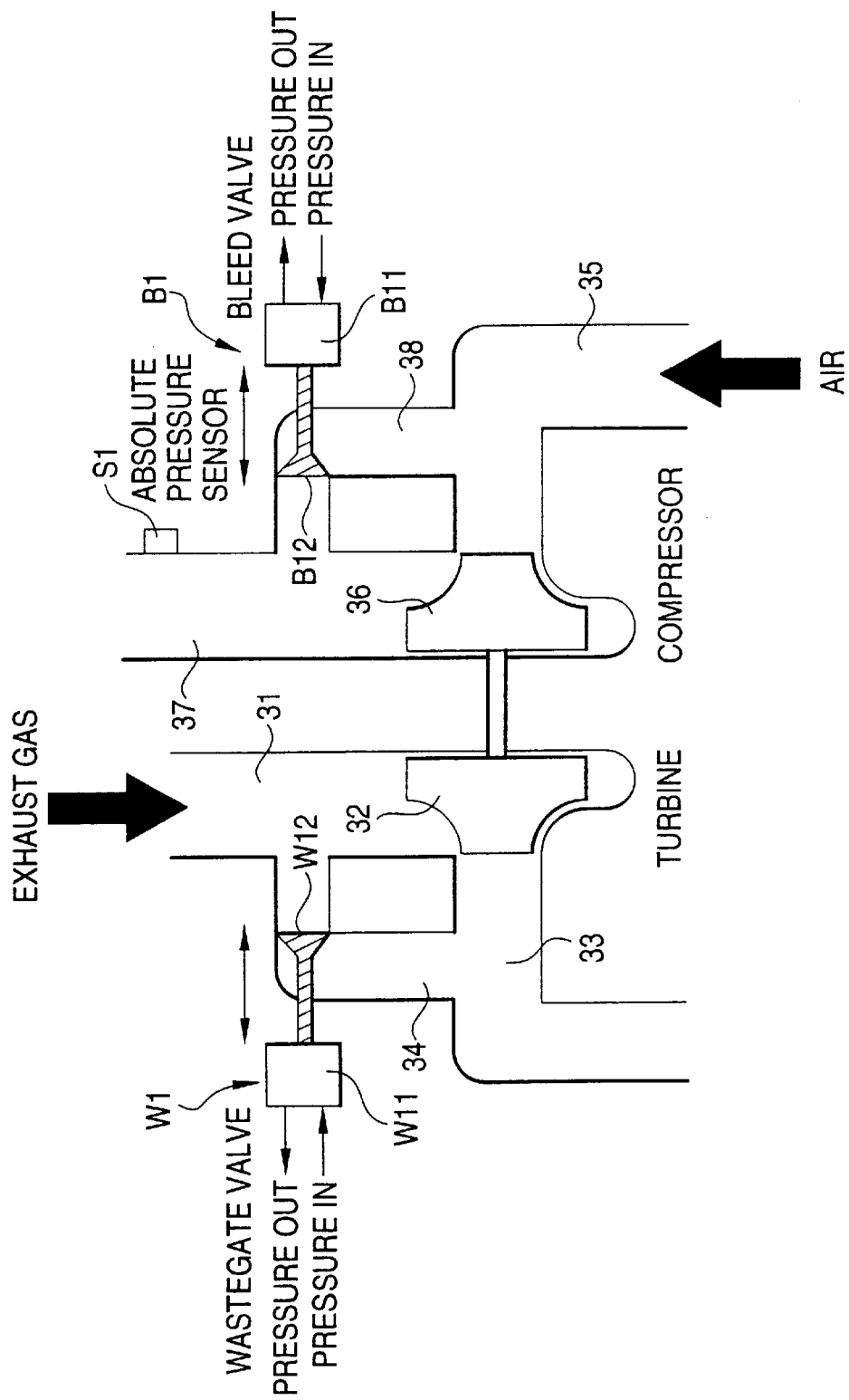
FIG. 2 is a schematic view for explaining the operation of a wastegate valve and a bleed valve shown in FIG. 1.

The wastegate valve W1 and the bleed valve B1 include, as shown in FIG. 2, actuators W11 and B11 operated using the lubricating oil pressure of the engine 20. Valve bodies W12 and B12 are opened and closed by the actuators W11 and B11, respectively.

As an operating source for the actuators, a different source of oil pressure or an electric servo motor may be used.

By operating the valve bodies W12 and B12, the opening degrees of the wastegate valve W1 and the bleed valve B1 are in proportion to the flow rate of the exhaust flowing through the turbine side bypass passage 34 and the flow rate of the intake air flowing through the compressor side bypass passage 38, respectively.

The intermediate pressure stage turbocharger 40 includes an exhaust intake pipe 41 for receiving exhaust from the exhaust pipe 33 of the high pressure stage turbocharger 30, an intermediate pressure stage turbine 42 driven by the received exhaust, and an exhaust pipe 43 for exhausting the gas from this turbine 42.

The intermediate pressure stage turbocharger 40 additionally includes a turbine side bypass passage 44 which allows exhaust received in the exhaust intake pipe 41 to bypass the intermediate pressure stage turbine 42 and to be directly supplied to the exhaust pipe 43 at the downstream side of turbine 42. Wastegate valve W2 controls the flow rate of exhaust flowing through the turbine side bypass passage 44. This valve W2 is provided at an intermediate location along the turbine side bypass passage 44.

The intermediate pressure stage turbocharger 40 also includes an intake air intake pipe 45 for receiving intake air from the low pressure stage turbocharger 50. An intermediate pressure stage compressor 46 is driven by the intermediate pressure stage turbine 42 to boost the intake air received through the intake air intake pipe 45. Additionally, an intake air supply pipe 47 supplies the intake air boosted by the intermediate pressure stage compressor 46 to the intake air intake pipe 35 of the high pressure stage turbocharger 30.

The intermediate pressure stage turbocharger 40 further includes a compressor side bypass passage 48 for extracting intake air boosted by the intermediate pressure stage compressor 46 from the intake air supply pipe 47 and for returning it to the intake air intake pipe 45 at the upstream side of compressor 46. The bleed valve B2 controls the flow rate of the intake air flowing through the compressor side bypass passage 48. This valve B2 is provided at an intermediate location along the compressor side bypass passage 48.

Further, an intercooler 49 for cooling the intake air supplied to the intake air intake pipe 35 of the high pressure stage turbocharger 30 is provided in the intake air supply pipe 47.

The wastegate valve W2 and the bleed valve B2 have the same structure as the wastegate valve W1 and the bleed valve B1 of the high pressure stage turbocharger 30. The opening degrees of valves W2 and B2 are in proportion to the flow rate of exhaust flowing through the turbine side bypass passage 44 and the flow rate of intake air flowing through the compressor side bypass passage 48, respectively.

The low pressure stage turbocharger 50 includes an exhaust intake pipe 51 for receiving exhaust from the exhaust pipe 43 of the intermediate pressure stage turbocharger 40. A low pressure stage turbine 52 is driven by the received exhaust, and an exhaust pipe 53 exhausts gas from this turbine 52. Additionally, the low pressure stage turbocharger 50 includes a turbine side bypass passage 54 which allows exhaust received in the exhaust intake pipe 51 to bypass the low pressure stage turbine 52 and to be directly supplied to the exhaust pipe 53 at the downstream side of turbine 52. The wastegate valve W3 controls the flow rate of exhaust flowing through the turbine side bypass passage 54. This valve W3 is provided at an intermediate location along the turbine side bypass passage 54.

The low pressure stage turbocharger 50 also includes an air intake pipe 55 for receiving air. A low pressure stage compressor 56 is driven by the low pressure stage turbine 52 to boost the air received through the air intake pipe 55. An intake air supply pipe 57 supplies intake air boosted by the low pressure stage compressor 56 to the intake air intake pipe 45 of the intermediate pressure stage turbocharger 40.

The low pressure stage turbocharger 50 additionally includes a compressor side bypass passage 58 for extracting intake air boosted by the low pressure stage compressor 56 from the intake air supply pipe 57 and for returning it to the air intake pipe 55 at the upstream side of the compressor 56. The bleed valve B3 controls the flow rate of intake air flowing through the compressor side bypass passage 58. This valve B3 is provided at an intermediate location along the compressor side bypass passage 58.

The wastegate valve W3 and the bleed valve B3 have the same structure as the wastegate valve W1 and the bleed valve B1 of the high pressure stage turbocharger 30. The opening degrees of valves W3 and B3 are in proportion to the flow rate of exhaust flowing through the turbine side bypass passage 54 and the flow rate of intake air flowing through the compressor side bypass passage 58, respectively.

As is apparent from FIGS. 1 and 2, in the multistage supercharging system 100 for a reciprocating engine according to this embodiment, even when part of the intake air boosted by each of the compressors 36, 46, and 56 is extracted and not supplied to the engine, the extracted intake air is returned to the upstream side of each of the respective compressors 36, 46, and 56.

In this manner, contrary to conventional systems in which intake air boosted by the compressor is thrown away via the exhaust passage, it is not necessary to make the compressor work more than absolutely necessary, and the efficiency of the whole system is improved.

The pressure sensors P1, P2, and P3 detect the pressure of the intake air in the intake air supply pipes 37, 47, and 57 of the turbochargers 30, 40, and 50 at the respective stages. Further, a pressure sensor P4 is provided for detecting the pressure of the air in the air intake pipe 55 of the low pressure stage turbocharger 50.

The control means constructed by a microcomputer separately controls the opening and closing of wastegate valves W1, W2, and W3 and bleed valves B1, B2, and B3 at the respective stages. The control means also separately controls the turbines 32, 42, and 52 and the compressors 36, 46, and 56 at the respective stages without depending on the turbochargers at the other stages.

By this separate control, in the multistage supercharging system 100 for a reciprocating engine according to this embodiment, it is not necessary to always operate all of the turbochargers at the plural stages. This is in contrast to existing systems, and this system makes it possible to reduce driving loss and to lower the fuel consumption rate of the engine as compared to existing systems.

When the pressure detected by the sensors P1, P2, and P3 reaches a predetermined value set for each stage, the control means operates the turbines 32, 42, and 52 and the compressors 36, 46, and 56 separately.

By this separate control, the multistage supercharging system 100 for a reciprocating engine according to this embodiment can operate the turbocharger at each stage at its highest efficiency based on the flight altitude of the aircraft, thereby improving the efficiency of the whole system.

If the values of the predetermined values set for each stage are suitably determined, at a previously set flight altitude, the ratio of the intake air pressure at the upstream side of the compressor to that at the downstream side thereof can be made equal for all of the stages of the system.

Figure 3:
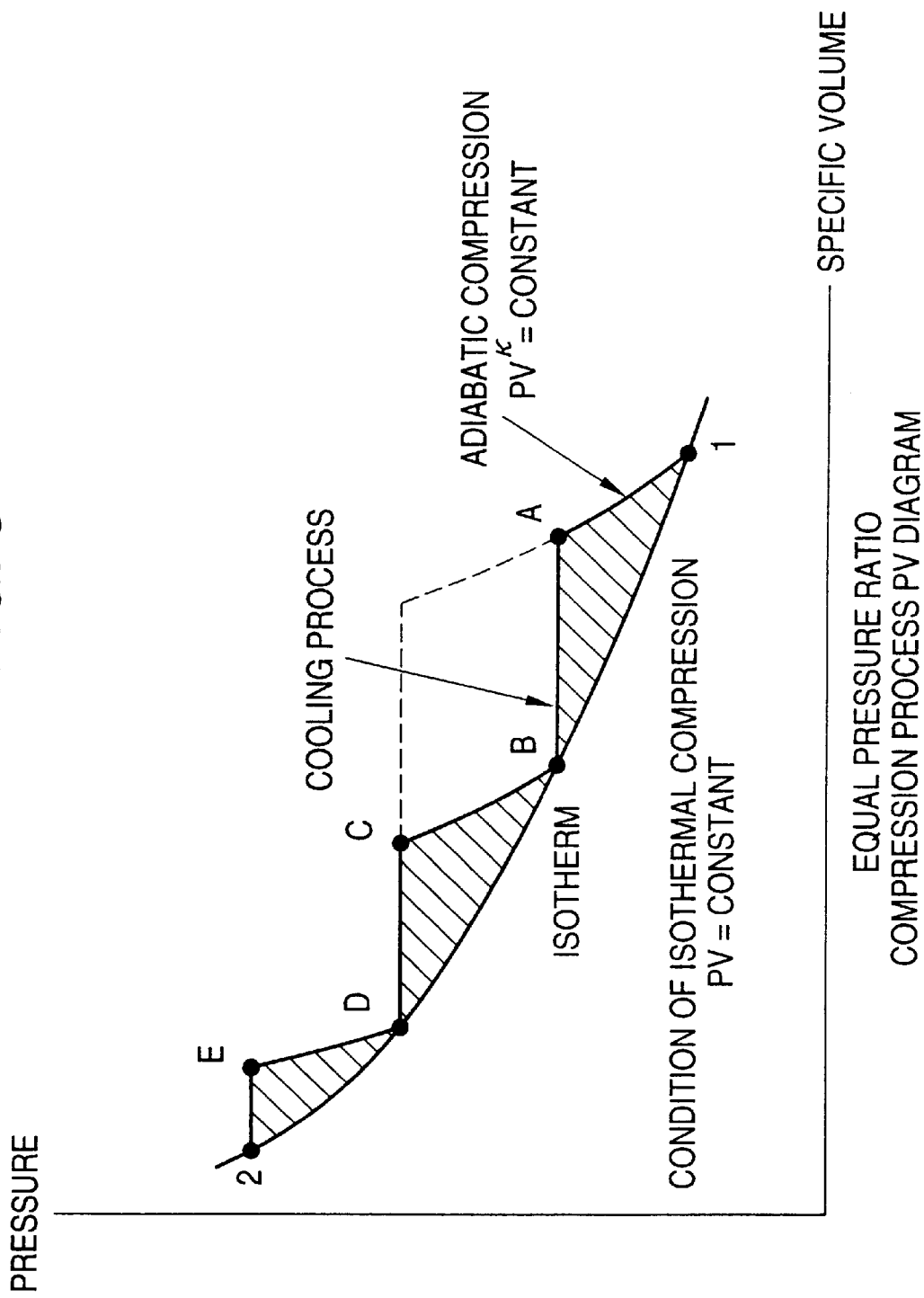
FIG. 3 is a compression process PV diagram in the case where pressure ratios of turbochargers at respective stages are equal to one another.

Then the compression work performed by the turbochargers 30, 40, and 50 at the respective stages boosts the intake air through the route of "1→A→B→C→D→E→2" in the compression process PV diagram shown in FIG. 3.

Figure 4:
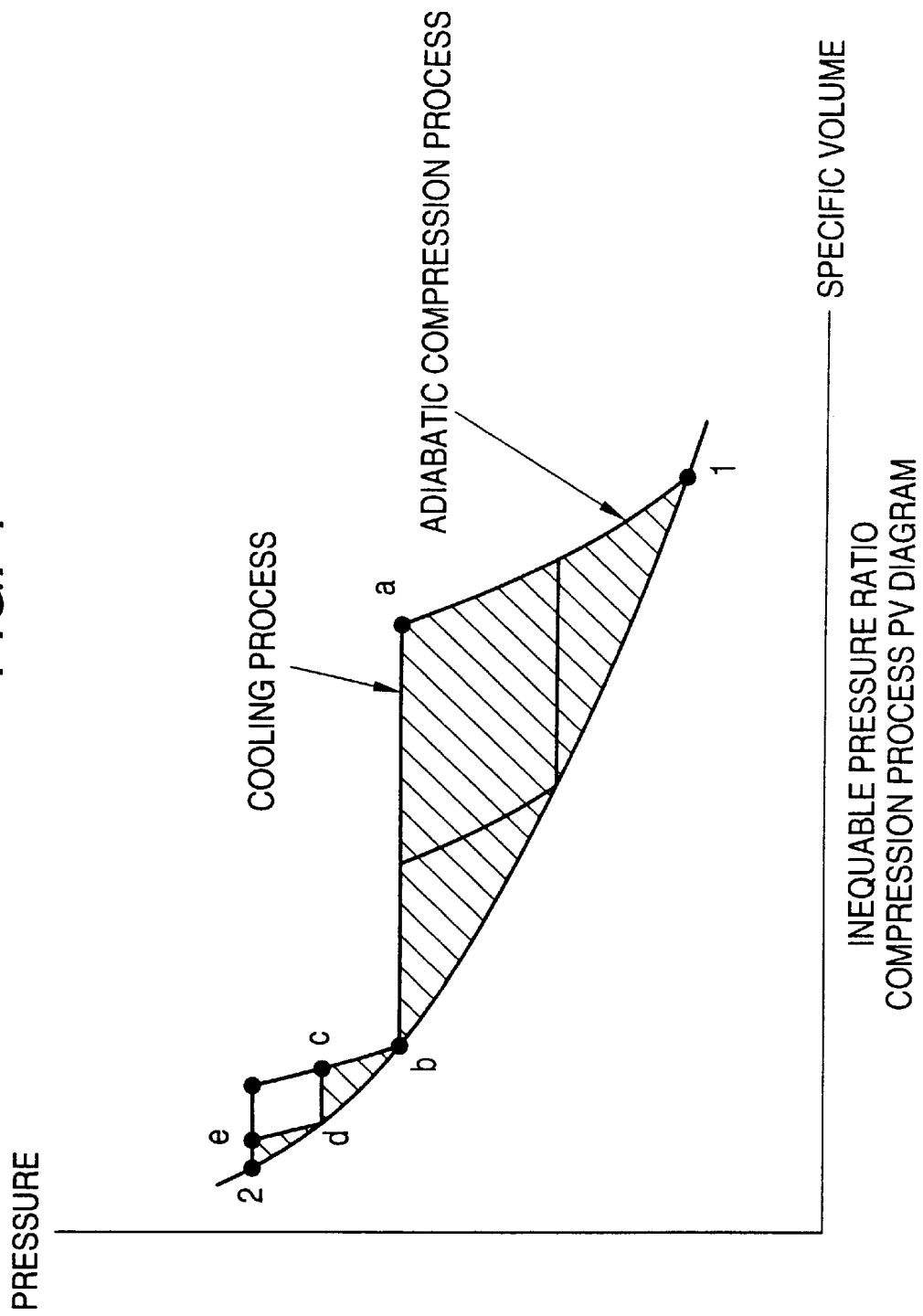
FIG. 4 is a compression process PV diagram in the case where pressure ratios of turbochargers at respective stages are unequal to one another.

On the other hand, when the pressure ratios of the turbochargers at the respective stages are not equal to each other, the compression work performed by the turbochargers 30, 40, and 50 at the respective stages boosts the intake air through the route of "1→a→b→c→d→e→2" in the compression process PV diagram shown in FIG. 4, so that the amount of work is increased in the large areas shaded with oblique lines in FIG. 4.

Accordingly, in the multistage supercharging system 100 for a reciprocating engine according to this embodiment, the compression work for boosting the intake air of the engine can be reduced, thereby improving the efficiency of the whole system.

In addition, in the system 100 according to the invention, when the changing rate of pressure per unit time detected by the sensors P1, P2, and P3 abruptly increases, the control means adjusts the opening degrees of the bleed valves B1, B2, and B3, and returns part of the boosted intake air from the downstream side to the upstream side of the compressors 36, 46, and 56 at the respective stages.

Therefore, even in the case where abrupt changes occur in the engine intake pressure (e.g., by influence of a gust or the like encountered during the flight), the respective wastegate valves W1, W2, and W3 and bleed valves B1, B2, and B3 operate together, so that it is possible to reduce the intake air pressure instability supplied to the engine and to quickly stabilize the operation of the engine.

Figure 5:
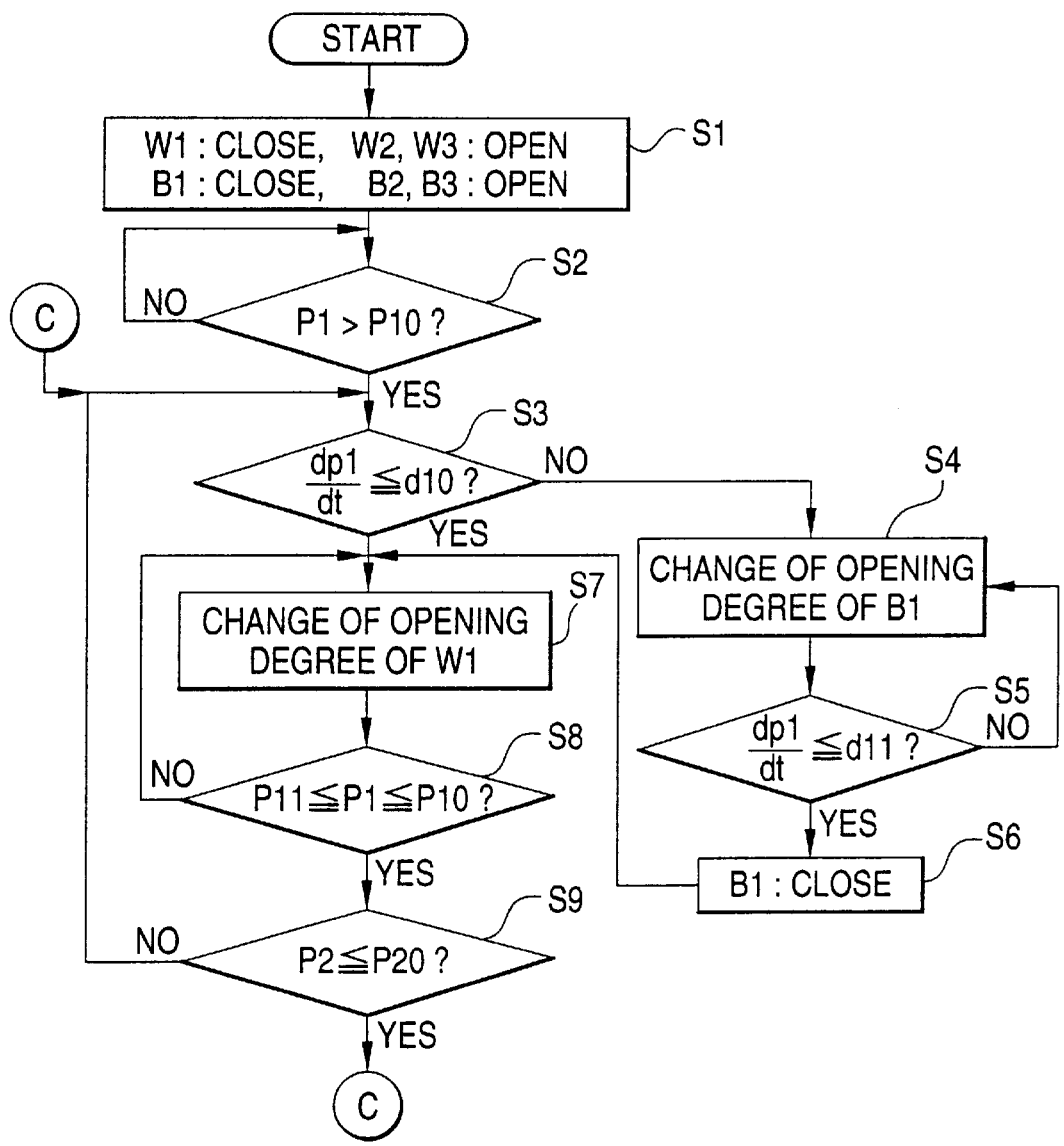
FIG. 5 is a flow chart for explaining the operation of a high pressure stage turbocharger shown in FIG. 1.
Figure 6:
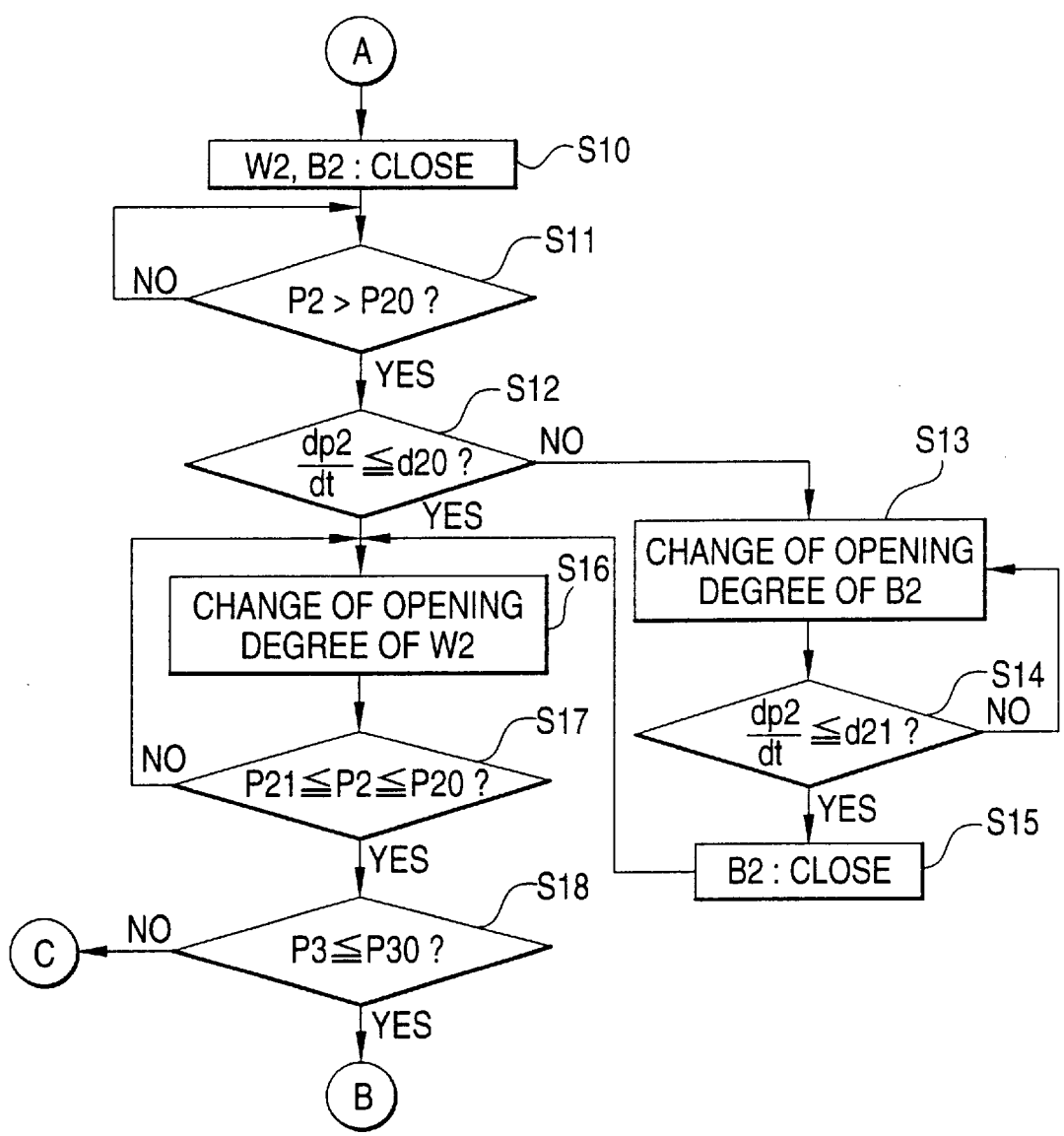
FIG. 6 is a flow chart for explaining the operation of an intermediate pressure stage turbocharger shown in FIG. 1.
Figure 7:
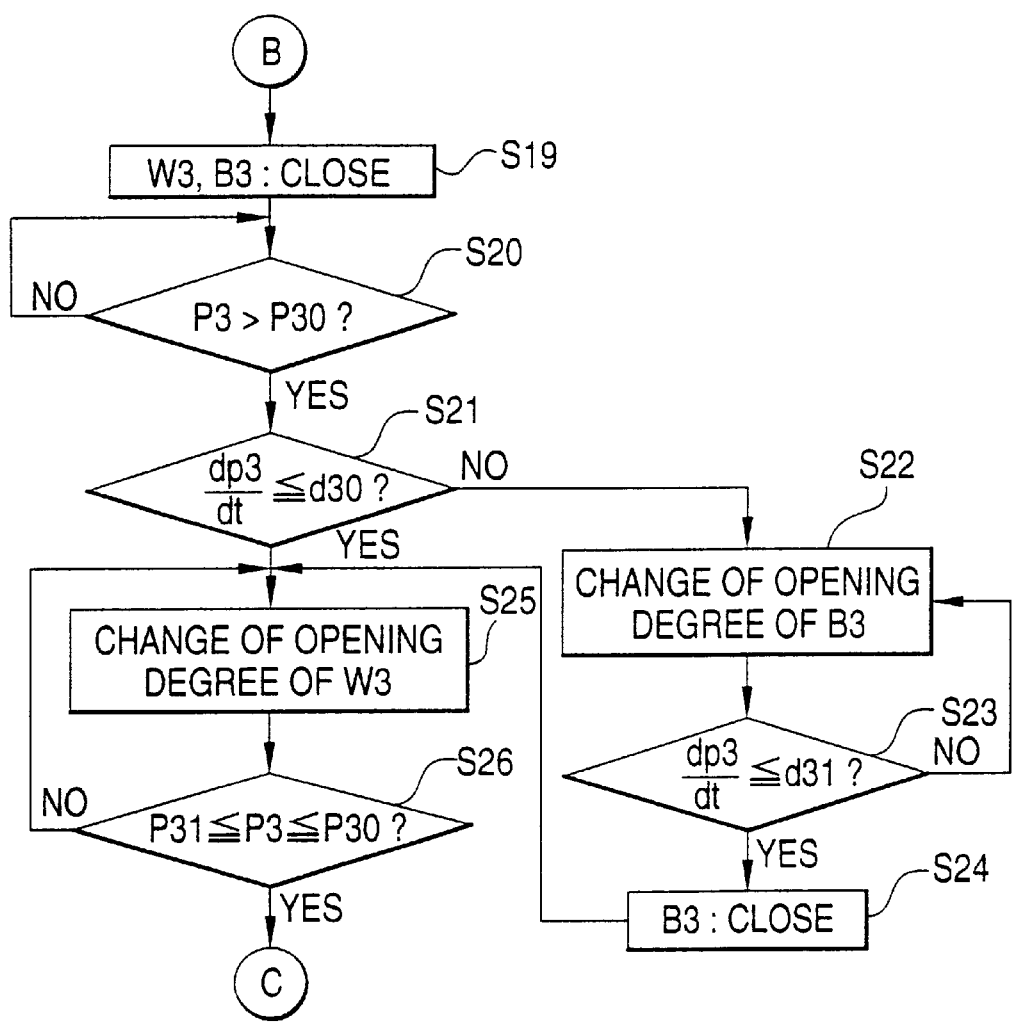
FIG. 7 is a flow chart for explaining the operation of a low pressure stage turbocharger shown in FIG. 1.
Figure 8:
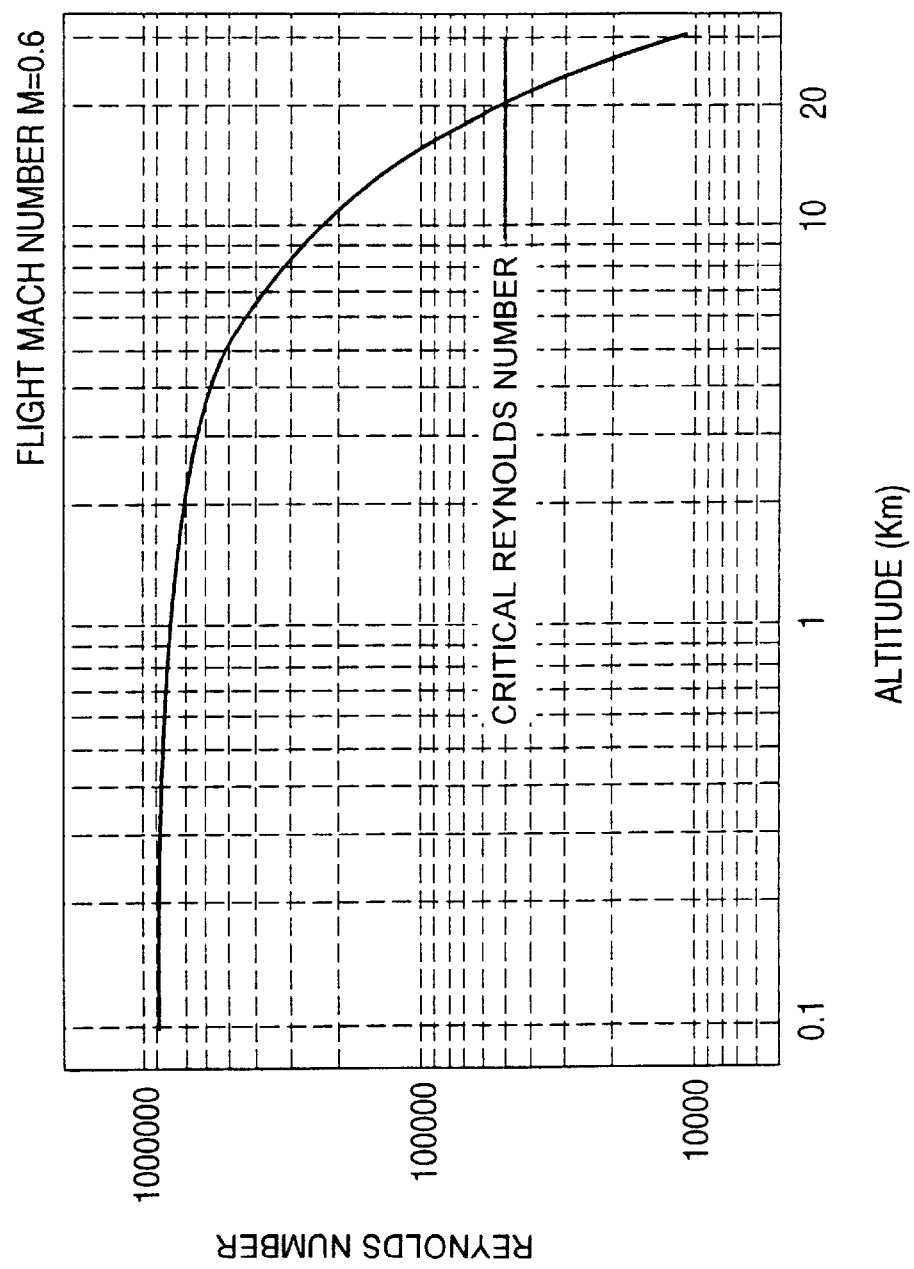
FIG. 8 is a diagram showing the relationship between altitude and Reynolds number.
Figure 9:
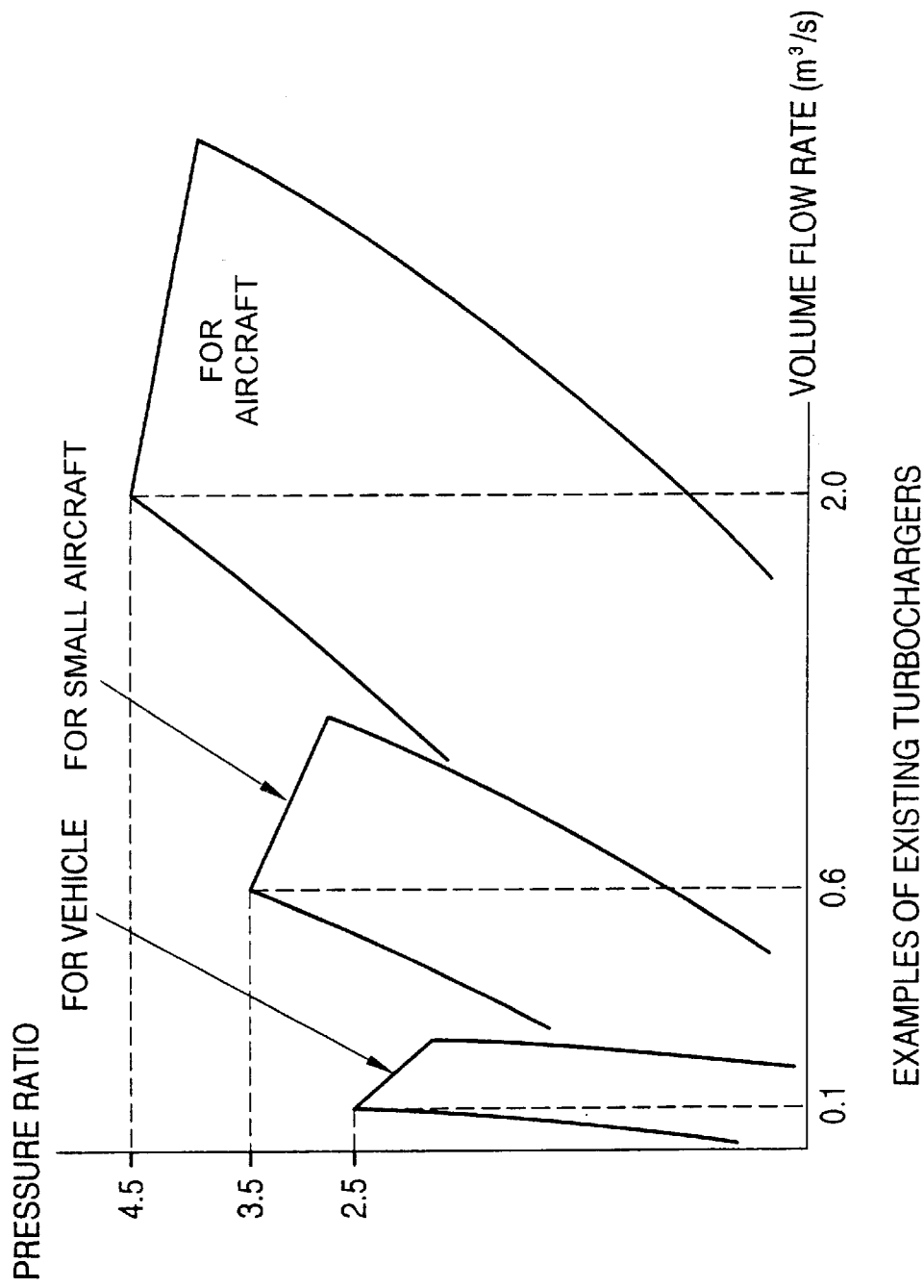
FIG. 9 is a diagram showing the comparison of pressure ratios of existing turbochargers.
Figure 10:
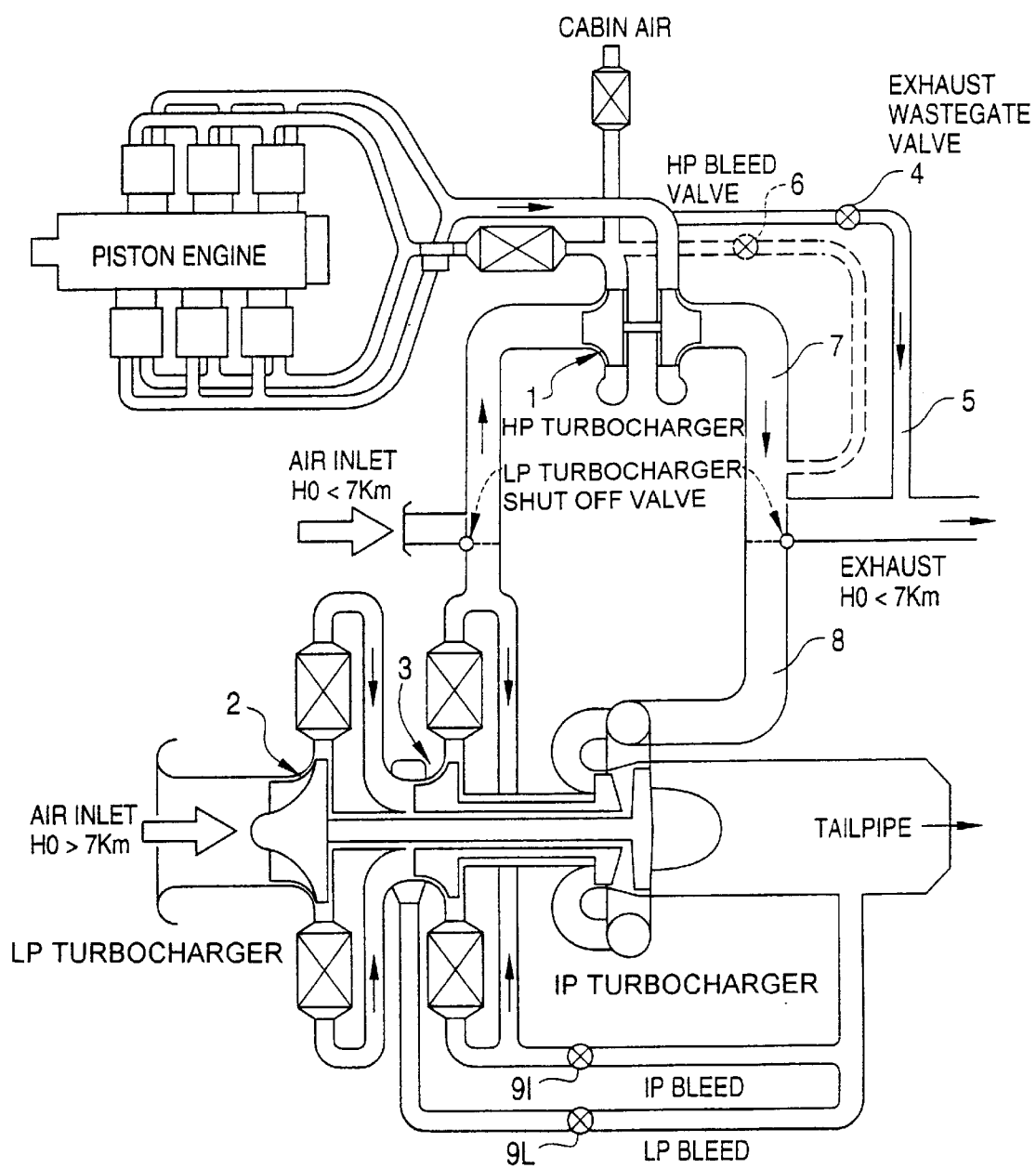
FIG. 10 is a schematic view of a reciprocating engine with three stage turbochargers made by German GROB Co.
Figure 11:
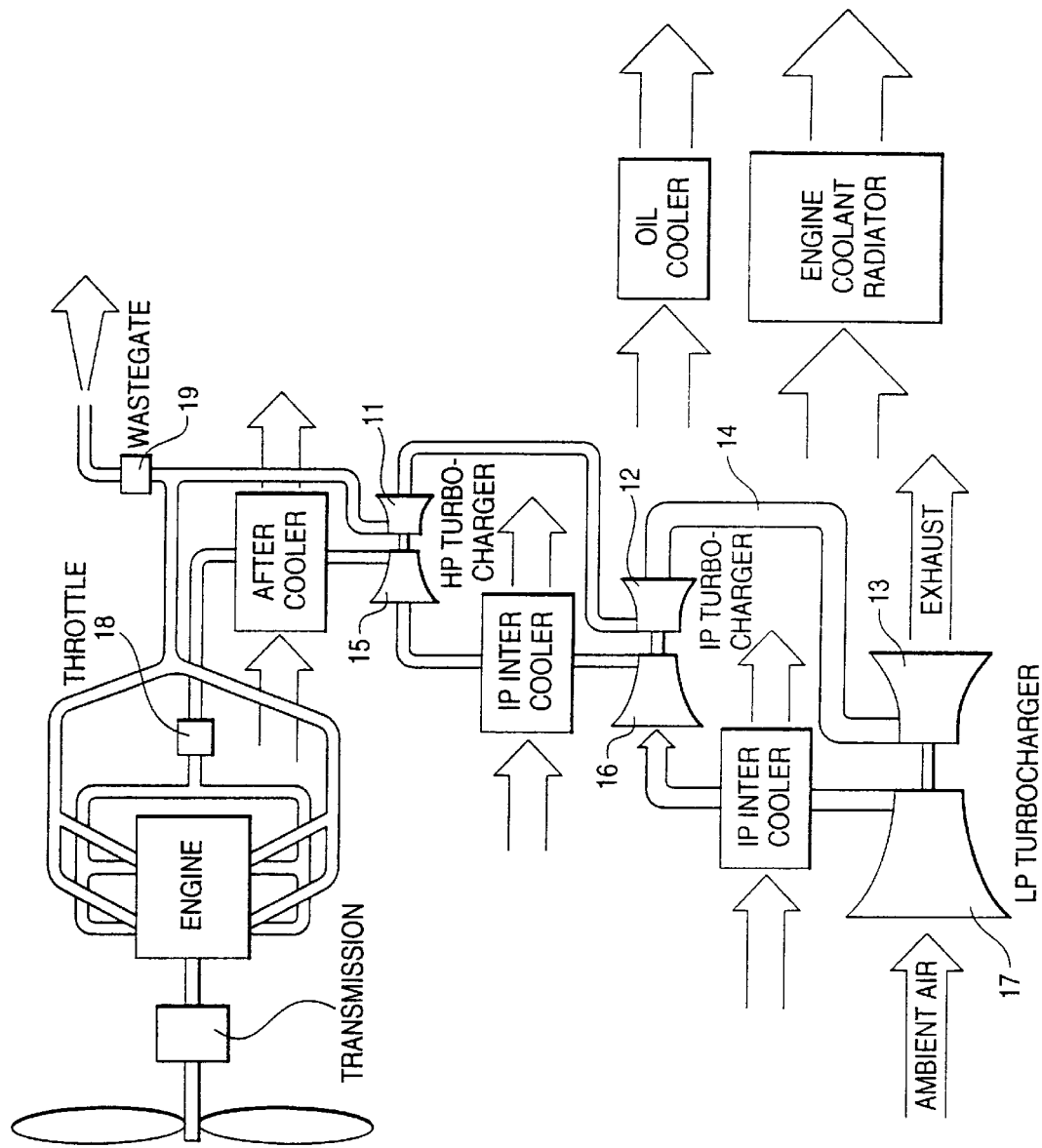
FIG. 11 is a schematic view of a reciprocating engine with three stage turbochargers made by NASA.

Next, the operation control of the multistage supercharging system 100 for a reciprocating engine according to this embodiment will be described with reference to the flow charts shown in FIGS. 5 to 7. This description will use, as an example, a case where an aircraft takes off and goes up.

At takeoff, at step (hereinafter expressed by "S") 1, the wastegate valve W1 and the bleed valve B1 of the high pressure stage turbocharger 30 are closed, and the wastegate valves W2 and W3, and the bleed valves B2 and B3 of the intermediate pressure stage turbocharger 40 and the low pressure stage turbocharger 50 are kept open.

In this configuration, only the high pressure stage turbocharger 30 operates. The intermediate pressure stage turbocharger 40 and the low pressure stage turbocharger 50 do not operate.

When the engine functions on all cylinders, all of the exhaust from the engine 20 is exhausted through the turbine 32 of the high pressure stage turbocharger 30. However, because the high pressure stage turbocharger 30 is set such that a pressure ratio of high efficiency can be first obtained when the aircraft reaches a predetermined altitude, the compression efficiency at takeoff is low, and the intake air supplied to the engine 20 is hardly boosted.

When altitude increases after takeoff and atmospheric pressure is gradually decreased, the pressure difference between the upstream side and the downstream side of the high pressure stage turbine 32 becomes large, and the number of revolutions of the turbine 32 is increased, resulting in operation of the high pressure stage compressor 36. By this operation, the intake air pressure supplied to the suction pipe 22 of the engine 20 becomes equal to the atmospheric pressure at ground level.

With increased altitude, the pressure of the air introduced into the high pressure stage compressor 36 is decreased. However, sufficient boosting can be accomplished by increasing the number of revolutions of the high pressure stage turbine 32.

At S2, the aircraft ascent is continued, and the pressure P1 of the intake air supplied to the suction pipe 22 of the engine 20 from the high pressure stage turbocharger 30 is continuously checked using the sensor P1.

When the value of P1 exceeds a predetermined value P10, the process proceeds to S3, and a change rate of the value of P1 per unit time is calculated. When the change rate exceeds a predetermined value d10 (e.g., by a gust or the like encountered during the ascent), the process proceeds to S4 at which the bleed valve B1 of the high pressure stage turbocharger 30 is opened.

When bleed valve B1 is opened, part of the intake air boosted by the high pressure stage compressor 36 is extracted from the intake air supply pipe 37 and returned to the intake air intake pipe 35 at the upstream side of the high pressure stage compressor 36. In this manner, the pressure P1 of the intake air supplied to the engine 20 is lowered.

At S5, when it is confirmed that the change rate of the value of P1 per unit time is smaller than a predetermined value d11, the process proceeds to S6 where the bleed valve B1 is closed. Then, the wastegate valve W1 is opened (at S7), so that the number of revolutions of the high pressure stage turbine 32 is controlled.

When the value of P1 gradually exceeds the predetermined value P10, the process proceeds to S7 where the wastegate valve W1 is opened, and the number of revolutions of the high pressure stage turbine 32 is controlled. By this action, the pressure of the intake air supplied to the engine 20 from the high pressure stage compressor 36 is lowered.

At S8, the system continuously checks whether the pressure P1 of the intake air supplied to the engine 20 is in the range between predetermined values P11 and P10.

At the same time, at S9, the pressure of the intake air supplied to the high pressure stage turbocharger 30 from the intermediate pressure stage turbocharger 40 is continuously checked using sensor P2.

In the period when the value of P2 is lower than a predetermined value P20, the loop of S3 to S9 is repeated.

On the other hand, when it is confirmed at S9 that the pressure P2 of the intake air supplied to the high pressure stage turbocharger 30 from the intermediate pressure stage turbocharger 40 is lower than the predetermined value P20, then supercharging using the intermediate pressure stage turbocharger 40 becomes necessary. At this time, a state as indicated by point D in the compression process PV diagram shown in FIG. 3 appears, and the control process shown in the flow chart of FIG. 6 is started.

More specifically, when the aircraft goes up and the pressure of the intake air supplied to the high pressure stage turbocharger 30 becomes lower than the predetermined value P20, at S10, the wastegate valve W2 and the bleed valve B2 of the intermediate pressure stage turbocharger 40 are closed.

By this action, all the intake air exhausted from the high pressure stage turbine 32 is introduced into the intermediate pressure stage turbine 42, and all the intake air boosted by the intermediate pressure stage compressor 46 flows into the high pressure stage compressor 36.

Immediately after the wastegate valve W2 and the bleed valve B2 are closed, the intake air is boosted by a small degree by the intermediate pressure stage compressor 46. However, as the aircraft further increases altitude, the pressure difference enlarges between the upstream side and the downstream side of the intermediate pressure stage turbine 42, and the number of revolutions of the intermediate pressure stage turbine 42 increases. In this manner, the degree of boosting of the intake air by the intermediate pressure stage compressor 46 also increases.

Because the operation of the intermediate pressure stage turbocharger 40 at S11 to S17 is the same as the operation of the high pressure stage turbocharger 30 at S2 to S8, a more detailed explanation will be omitted.

At S18, while the pressure P3 of the air supplied to the intermediate pressure stage turbocharger 40 exceeds a predetermined value P30, the loop of S3 to S18 is repeated.

On the other hand, when it is confirmed that the pressure P3 of the air supplied to the intermediate pressure stage turbocharger 40 has become lower than the predetermined value P30, supercharging using the low pressure stage turbocharger 50 becomes necessary. At this time, a state as indicated by point B in the compression process PV diagram shown in FIG. 3 appears, and the control process shown in the flow chart of FIG. 7 is started.

More specifically, when the aircraft goes up and the pressure of the intake air supplied to the intermediate pressure stage turbocharger 40 becomes lower than the predetermined value P30, at S19, the wastegate valve W3 and the bleed valve B3 of the low pressure stage turbocharger 50 are closed.

By this action, all the exhaust exhausted from the intermediate pressure stage turbine 42 is introduced into the low pressure stage turbine 52, and all the intake air boosted by the low pressure stage compressor 56 is introduced into the intermediate pressure stage compressor 46.

Immediately after the wastegate valve W3 and the bleed valve B3 are closed, the intake air is boosted by a small degree by the low pressure stage compressor 56. However, as the aircraft further increases altitude, the pressure difference enlarges between the upstream side and the downstream side of the low pressure stage turbine 52, and the number of revolutions of the low pressure stage turbine 52 increases. In this manner, the degree of boosting of the intake air by the low pressure stage compressor 56 also increases.

Because the operation of the low pressure stage turbocharger 50 at S20 to S26 is the same as the operation of the high pressure stage turbocharger 30 at S2 to S8, a more detailed explanation will be omitted.

At S26, while the pressure P3 of the boosted intake air supplied to the intermediate pressure stage turbocharger 40 from the low pressure stage turbocharger 50 is within the range of from P31 to P30, the loop of S3 to S26 is repeated.

The pressure P4 of the air introduced into the low pressure stage compressor 50 is continuously checked, and in this manner it is possible to confirm whether the airplane reaches a predetermined altitude.

After the aircraft has reached the predetermined altitude, the opening degree of a throttle valve is adjusted to adjust the output of the engine 20, so that the flight altitude is controlled.

Incidentally, for improving the response, a throttle valve 23 is provided in the suction pipe 22 of the engine 20, which receives the boosted intake air from the high pressure stage turbocharger 30. See FIG. 1.

The various predetermined values in the foregoing explanation, that is, the values of P10, P11, d10, d11, P20, P21, d20, d21, P30, P31, d30, and d31 are set to values based on the opening degree of the throttle valve 23 so that the multistage supercharging system 100 is effectively operated.

The descent of the aircraft is carried out by adjusting the throttle opening degree while checking the altitude. When the aircraft reaches a predetermined altitude, compression naturally is not performed. Therefore, it is not necessary to open the wastegate valves and the bleed valves.

As described before, in the state where the aircraft cruises at a predetermined altitude of 25 km, the ratios of the intake air pressures at the upstream sides of the compressors 36, 46, and 56 at the respective stages to those at the downstream sides thereof are equal to each other.

Thus, when an aircraft goes up to an altitude of 25 km using the multistage supercharging system 100 according to this embodiment, if the compression ratio of about 3.42 is obtained at each stage, intake air with a pressure equal to the air pressure at ground level can be supplied to the engine 20. A compression ratio of about 3.42 for each stage is a value which can be sufficiently attained by existing technology.

As is apparent from the above description, in the multistage supercharging system according to the present invention, the wastegate valves and the bleed valves of the turbochargers at the respective stages are separately controlled, so that the turbochargers at the respective stages can be separately operated from the turbochargers at the other stages. In this manner, because it is not necessary to operate all the turbochargers at the plural stages (in contrast to existing systems), driving loss can be reduced and the fuel consumption rate of the engine can be lowered.

In addition, when the pressure value obtained from the pressure sensor at one of the stages reaches a predetermined value for that stage, the wastegate valve and the bleed valve at that stage are controlled so that the turbine and the compressor at that stage can be operated.

In this system, it is possible to operate the turbocharger at each stage within the range of highest efficiency based on the flight altitude of the aircraft, thereby improving the efficiency of the whole system.

If the predetermined value set for each stage is suitably determined, at a previously set flight altitude, the ratio of the intake air pressure at the upstream side of the compressor of the turbocharger to that at the downstream side thereof can be made equal for all of the stages.

In this manner, because the compression work for boosting the engine intake air can be performed close to the isotherm of the compression process PV diagram, it is possible to reduce the compression work and to improve the efficiency of the whole system.

Also, in the multistage supercharging system for the reciprocating engine according to the present invention, when part of the intake air boosted by the compressor is extracted and not supplied to the engine, the extracted intake air is returned to the upstream side of the compressor.

By this action, in contrast to conventional systems in which intake air boosted by the compressor is thrown away via the exhaust passage, it is not necessary to make the compressor work more than absolutely necessary, thereby improving the efficiency of the whole system.

The multistage supercharging system according to the present invention comprises bleed valves at the compressor side bypass passage for returning the intake air from the downstream side of the compressor at each stage to the upstream side.

By this arrangement, when abrupt changes occur in the engine intake air pressure by influence of a gust or the like encountered during flight, the wastegate valve provided at the turbine side bypass passage and the bleed valve provided at the compressor side bypass passage operate together to improve the stability of pressure control of the intake air supplied to the engine and to quickly stabilize the operation of the engine.

While the presently preferred embodiments of the present invention have been shown and described, it is to be understood that these disclosures are for the purpose of illustration and that various changes and modifications may be made without departing from the scope of the invention as set forth in the appended claims.

What is claimed is:

1. A multistage supercharging system for a reciprocating engine, comprising:
   a high pressure turbocharger stage for introducing intake air to the engine and for receiving exhaust from the engine, the high pressure turbocharger stage including:
   a high pressure stage turbine rotated by exhaust from the engine and a high pressure stage compressor driven by said high pressure stage turbine for boosting intake air introduced to the engine, a high pressure stage turbine side bypass passage connecting an upstream side of said high pressure stage turbine with a downstream side of said high pressure stage turbine for allowing said exhaust to bypass said high pressure stage turbine, a high pressure stage compressor side bypass passage connecting a downstream side of said high pressure stage compressor with an upstream side of said high pressure stage compressor for returning compressed intake air to said high pressure stage compressor, a high pressure stage wastegate valve provided in said high pressure stage turbine side bypass passage for controlling an exhaust flow rate in said high pressure stage turbine side bypass passage, a high pressure stage bleed valve provided in said high pressure stage compressor side bypass passage for controlling an intake air flow rate in said high pressure stage compressor side bypass passage, a high pressure stage pressure sensor for measuring intake air pressure downstream of said high pressure stage compressor, and high pressure stage valve operating means for operating said high pressure stage wastegate valve and said high pressure stage bleed valve;

an intermediate pressure turbocharger stage for introducing intake air to the high pressure turbocharger stage and for receiving exhaust from the high pressure turbocharger stage, the intermediate pressure turbocharger stage including:

an intermediate pressure stage turbine rotated by exhaust from said high pressure stage turbine and an intermediate pressure stage compressor driven by said intermediate pressure stage turbine for boosting intake air introduced to said high pressure stage compressor, an intermediate pressure stage turbine side bypass passage connecting an upstream side of said intermediate pressure stage turbine with a downstream side of said intermediate pressure stage turbine for allowing said exhaust to bypass said intermediate pressure stage turbine, an intermediate pressure stage compressor side bypass passage connecting a downstream side of said intermediate pressure stage compressor with an upstream side of said intermediate pressure stage compressor for returning compressed intake air to said intermediate pressure stage compressor, an intermediate pressure stage wastegate valve provided in said intermediate pressure stage turbine side bypass passage for controlling an exhaust flow rate in said intermediate pressure stage turbine side bypass passage, an intermediate pressure stage bleed valve provided in said intermediate pressure stage compressor side bypass passage for controlling an intake air flow rate in said intermediate pressure stage compressor side bypass passage, an intermediate pressure stage pressure sensor for measuring intake air pressure downstream of said intermediate pressure stage compressor, and intermediate pressure stage valve operating means for operating said intermediate pressure stage wastegate valve and said intermediate pressure stage bleed valve;

a low pressure turbocharger stage for introducing intake air to the intermediate pressure turbocharger stage and for receiving exhaust from the intermediate pressure turbocharger stage, the low pressure turbocharger stage including:

a low pressure stage turbine rotated by exhaust from said intermediate pressure stage turbine and a low pressure stage compressor driven by said low pressure stage turbine for boosting intake air introduced to said intermediate pressure stage compressor, a low pressure stage turbine side bypass passage connecting an upstream side of said low pressure stage turbine with a downstream side of said low pressure stage turbine for allowing said exhaust to bypass said low pressure stage turbine, a low pressure stage compressor side bypass passage connecting a downstream side of said low pressure stage compressor with an upstream side of said low pressure stage compressor for returning compressed intake air to said low pressure stage compressor, a low pressure stage wastegate valve provided in said low pressure stage turbine side bypass passage for controlling an exhaust flow rate in said low pressure stage turbine side bypass passage, a low pressure stage bleed valve provided in said low pressure stage compressor side bypass passage for controlling an intake air flow rate in said low pressure stage compressor side bypass passage, a low pressure stage pressure sensor for measuring intake air pressure downstream of said low pressure stage compressor, and low pressure stage valve operating means for operating said low pressure stage wastegate valve and said low pressure stage bleed valve; and control means for independently controlling the high pressure stage valve operating means, the intermediate pressure stage valve operating means, and the low pressure stage valve operating means based on respective pressure values obtained from the high pressure stage pressure sensor, the intermediate pressure stage pressure sensor, and the low pressure stage pressure sensor.

2. A multistage supercharging system according to claim 1, further comprising:

an intake air inlet line for introducing ambient air to the low pressure stage compressor.

3. A multistage supercharging system according to claim 2, further comprising:

an inlet air pressure sensor for sensing the pressure upstream of the low pressure stage compressor.

4. A multistage supercharging system according to claim 2, further comprising:

an exhaust gas outlet for discharging exhaust gas from the low pressure stage turbine.

5. A multistage supercharging system according to claim 1, further comprising:

an exhaust gas outlet for discharging exhaust gas from the low pressure stage turbine.

6. A multistage supercharging system according to claim 1, wherein:

each of said high pressure stage valve operating means, said intermediate pressure stage valve operating means, and said low pressure stage valve operating means uses pressure of engine lubricating oil to operate its associated wastegate valve and its associated bleed valve.

7. A multistage supercharging system according to claim 1, wherein:

each of said high pressure stage pressure sensor, said intermediate pressure stage pressure sensor, and said low pressure stage pressure sensor detects an absolute pressure.

8. A multistage supercharging system according to claim 1, wherein:

each of said high pressure stage compressor, said intermediate pressure stage compressor, and said low pressure stage compressor is a centrifugal compressor.

9. A multistage supercharging system according to claim 1, further comprising:

an inlet air pressure sensor for sensing the pressure upstream of the low pressure stage compressor.

10. A multistage supercharging system for a reciprocating engine, comprising:

a plurality of turbocharger stages connected in series to each other, each turbocharger stage having:
a turbine rotated by exhaust from said reciprocating engine and a compressor driven by said turbine for boosting intake air introduced to said reciprocating engine,
a turbine side bypass passage connecting an upstream side of said turbine with a downstream side of said turbine for allowing said exhaust to bypass said turbine,
a compressor side bypass passage connecting a downstream side of said compressor with an upstream side of said compressor for returning compressed intake air to said compressor,
a wastegate valve provided in said turbine side bypass passage for controlling an exhaust flow rate in said turbine side bypass passage,
a bleed valve provided in said compressor side bypass passage for controlling an intake air flow rate in said compressor side bypass passage,
a pressure sensor for measuring intake air pressure downstream of said compressor, and
valve operating means for operating said wastegate valve and said bleed valve; and control means for independently controlling said valve operating means of each stage based on a respective pressure value obtained from said pressure sensor of each stage.

11. The multistage supercharging system according to claim 10, wherein:

said control means operates said valve operating means at each stage to open said bleed valve at that stage when an increasing rate per unit time in pressure values obtained from said pressure sensor for that stage exceeds a predetermined value set for that stage so that part of the intake air boosted by said compressor at that stage is returned to the upstream side of said compressor for that stage through said compressor side bypass passage for that stage.

12. The multistage supercharging system according to claim 10, wherein:

each of said wastegate valves includes a valve body wherein an opening degree of said wastegate valve is in proportion to an amount of the exhaust flowing through its associated turbine side bypass passage.

13. The multistage supercharging system according to claim 10, wherein:

each of said bleed valves includes a valve body wherein an opening degree of said bleed valve is in proportion to an amount of the intake air flowing through its associated compressor side bypass passage.

14. The multistage supercharging system according to claim 10, wherein:

each of said valve operating means uses pressure of engine lubricating oil to operate its associated wastegate valve and its associated bleed valve.

15. The multistage supercharging system according to claim 10, wherein:

each of said pressure sensors detects an absolute pressure.

16. The multistage supercharging system according to claim 10, wherein:

each of said compressors is a centrifugal compressor.

17. The multistage supercharging system according to claim 10, wherein:

said control means operates said valve operating means at each stage to close said turbine side bypass passage and said compressor side bypass passage at that stage, to thereby initiate operation of said turbine and said compressor at that stage when a pressure value obtained from said pressure sensor at that stage reaches a predetermined value set for that stage.

18. The multistage supercharging system according to claim 17, wherein:

each stage includes a ratio of intake air pressure at the upstream side of said compressor for that stage to intake air pressure at the downstream side of said compressor for that stage, and wherein the predetermined value set at each of the stages is determined such that at a previously set flight altitude, the ratios at each of the stages are equal.

* * * * *